US006969804B2

(12) United States Patent
Payne

(10) Patent No.: US 6,969,804 B2
(45) Date of Patent: Nov. 29, 2005

(54) CONNECTOR FOR SECURING PROTECTION DEVICE TO CABLE

(75) Inventor: Roger A. Payne, Alliance, OH (US)

(73) Assignee: Salem-Republic Rubber Company, Sebring, OH (US)

(*) Notice: Subject to any disclaimer, the term of this patent is extended or adjusted under 35 U.S.C. 154(b) by 94 days.

(21) Appl. No.: 10/178,162

(22) Filed: Jun. 24, 2002

(65) Prior Publication Data

US 2003/0000729 A1 Jan. 2, 2003

Related U.S. Application Data

(60) Provisional application No. 60/301,623, filed on Jun. 27, 2001.

(51) Int. Cl.[7] .............................................. H01G 15/02
(52) U.S. Cl. ................. 174/74 R; 174/74 A; 174/77 R
(58) Field of Search ................................ 174/36, 74 R, 174/74 A, 77 R, 80, 92, 93; 439/274, 275, 439/276, 277, 278, 279

(56) References Cited

U.S. PATENT DOCUMENTS 3,624,594 A * 11/1971 Trimble et al. ............. 439/523
3,995,964 A 12/1976 De Groef
4,144,404 A 3/1979 De Groef et al.
4,179,320 A 12/1979 Midgley et al.
4,287,012 A 9/1981 Midgley et al.
4,384,404 A * 5/1983 Watine ........................ 29/871
4,424,411 A 1/1984 Clabburn
4,433,206 A * 2/1984 Lewis ...................... 174/35 C
4,555,839 A 12/1985 Thurber
4,866,842 A * 9/1989 Gorjat ......................... 29/857
4,896,000 A * 1/1990 Procter et al. ............ 174/74 R
5,098,753 A * 3/1992 Gregory et al. ............ 428/34.9
5,215,607 A * 6/1993 Read et al. .................... 156/56
5,226,837 A * 7/1993 Cinibulk et al. ............ 439/521
5,278,354 A 1/1994 Lhomme
5,301,213 A 4/1994 Linden et al.

(Continued)

FOREIGN PATENT DOCUMENTS

DE 2 286 522 A * 9/1975 .......... H01R 17/00

OTHER PUBLICATIONS

An advertising flyer from RAYCHEM Corp. Electrical Products entitled "Inline joints for plastic and rubber insulated cables up to 1 kV with or without armour or concentral neutrals" bearing a copyright date of Jun. 1994.

(Continued)

*Primary Examiner*—William H. Mayo, III
(74) *Attorney, Agent, or Firm*—Buckingham, Doolittle & Burroughs, LLP; David P. Dureska; Edward T. Kennedy

(57) ABSTRACT

A connector for securing a protective sleeve about an electrical cable portion of an electrical cable assembly. The connector is formed of heat-shrinkable tubing and is slipped over the cuff of the sleeve and a portion of an adjacent plug of the cable assembly. Upon the application of sufficient heat to the connector, the connector shrinks around and onto the sleeve cuff and plug portion to form a relatively thin, smooth, mechanical attachment between the sleeve cuff and plug portion. The protective sleeve is thereby immovably disposed about the cable portion of the electrical cable assembly to minimize wear and tear to the cable portion during use in supplying temporary electrical power to planes at an airport.

7 Claims, 1 Drawing Sheet

U.S. PATENT DOCUMENTS

| | | | | |
|---|---|---|---|---|
| 5,399,808 | A * | 3/1995 | Carter et al. | 174/80 |
| 5,536,183 | A * | 7/1996 | Brandolf | 439/470 |
| 6,048,224 | A * | 4/2000 | Kay | 439/445 |
| 6,123,567 | A * | 9/2000 | McCarthy | 439/427 |
| 6,319,048 | B1 * | 11/2001 | Aekins et al. | 439/418 |
| 2001/0055913 | A1 * | 12/2001 | Winings | 439/625 |

OTHER PUBLICATIONS

A web page article from Raychem entitled "Cable Protection and Heat-Shrinkable Tubing for Electrical Insulation, Mechanical Protection and Strain Relief" http://www.raychem.com/products/elec/htshrink.htm, dated Apr. 16, 2002.

* cited by examiner

CONNECTOR FOR SECURING PROTECTION DEVICE TO CABLE

This application claims the benefit of provisional application 60/301,623 filed Jun. 27, 2001.

BACKGROUND OF THE INVENTION

The invention relates to a connector for securing a protection device to a cable, and in particular to a connector for immovably securing a protection device on an electrical cable assembly of the type used to supply ground power to aircraft at airports. More particularly, the present invention is directed to a relatively smooth connector that facilitates easy handling of the cable assembly, that does not significantly increase the diameter of the plug portion of the assembly, that forms a secure immovable disposition of the protection device about the cable portion of the assembly, and which is capable of withstanding the wear and tear encountered during normal use of the electrical cable assembly.

BACKGROUND ART

Electrical cables are commonly used to provide temporary electrical power to equipment such as airplanes when the plane cannot supply its own electrical power, such as when it is at rest on the ground at an airport gate. Such electrical cables must be dragged on the surface on which the plane is parked, typically concrete, from a stationary power source to the receptacle location on the plane where a plug at the end of the cable is electrically connected to the plane. As the cable is repeatedly dragged on the concrete, the insulation on the cable can be worn away, ultimately causing failure of the cable.

These types of cables have been conventionally protected by wrapping them with some type of tape, or by sliding sections of plastic pipe over the cable. While these protective structures partially accomplish the objective of protecting the cable, each solution makes the cable difficult to handle and move, and does not thoroughly complete the task of protecting the cable from the degree of wear and tear it is exposed to in an airport application.

A protective sleeve similar to the type used to protect jet aircraft starting hoses has also been utilized with success to protect aircraft electrical cables. One example of this type of protective sleeve suitable for use with the present invention is relatively lightweight and flexible due to its formation from a combination of materials, and is sold under the trademark LCD™ by Salem-Republic Rubber Company, the assignee of the present invention, and is proprietary technology. Such a protective sleeve slides easily, with little abrasion, across the concrete airport surface.

However, in order for such a protective sleeve to properly function, as has heretofore been the case with more conventional protection devices, a means must be provided to achieve a secure mechanical connection of the protective sleeve to the cable assembly. This secure connection is necessary to retain the protective sleeve in place about the cable portion of the assembly. If the sleeve is free to move along the length of the cable portion, such relocation may expose the cable to wear. Also, movement of the sleeve could cause it to bunch up, possibly leading to failure of the protective sleeve. Moreover, the means utilized to secure the sleeve in place on the cable assembly must not significantly increase the size of the plug, which could prevent the plug from fitting in a limited space in the plug receptacle on the plane. Finally, any such securing means must still enable the protective sleeve to be easily removed in the event that the cable assembly or sleeve requires repair. The use of common band clamps and the like to connect the protective sleeve to the cable assembly are undesirable because they can cause injury to a worker's hands which are placed at the juncture of the cable plug to the cable every time it is plugged into the aircraft.

The present invention solves a long-felt need in the art of mechanically and securely connecting a protection device to an aircraft electrical cable to reduce or eliminate wear and tear on the cable, wherein the connector is easy to handle by a worker. Moreover, the connector does not significantly increase the diameter of the already large cable plug which electrically connects the cable to a receptacle on the plane, since the space adjacent to the receptacle is limited.

SUMMARY OF INVENTION

Objectives of the present invention include providing a connector which mechanically and securely attaches a protection device to an aircraft electrical cable, to reduce wear and tear to the cable during use.

Another objective of the present invention is to provide such a connector which is easily handled by a worker, and which does not substantially increase the diameter of the cable plug.

A further objective of the present invention is to provide such a connector which is relatively inexpensive, durable, and easy to install and remove.

These objectives and advantages are obtained by the electrical cable assembly including an electrical cable having at least a pair of ends. The cable is electrically connected to a power source at one of the pair of ends and is electrically connected to a plug at the other of the pair of ends and is encased in a protective sleeve. The improvement comprises, a heat-shrinkable member disposed about a portion of the protective sleeve adjacent to the plug and at least a portion of the plug, so that upon application of heat to the member, the member shrinks into contact with the sleeve and the plug to immovably secure the sleeve in place about the electrical cable.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
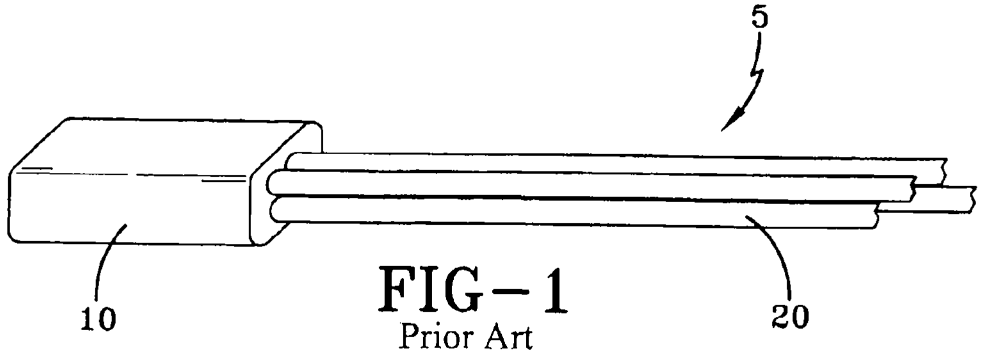
FIG-1 Prior Art
FIG. 1 is a fragmentary perspective view of an electrical cable assembly of the type with which the present invention is useful, comprising an electrical cable and a plug.

An electrical cable assembly of the type well-known in the art and capable of carrying electrical power to equipment such as an airplane when the plane cannot supply its own electrical power, such as when the plane is at rest on the ground at an airport gate, is indicated generally at 5, and is shown in FIG. 1. Electrical cable assembly 5 comprises an electrical cable 20 and a plug 10 electrically connected to a selected one of the ends of the cable. The end of cable 20 opposite from plug 10 is electrically connected to a power source in a usual manner. Cable plug 10 thus can be inserted into an electrical receptacle on a piece of equipment, such as an airplane (not shown), to provide temporary electrical power.

Figure 2:
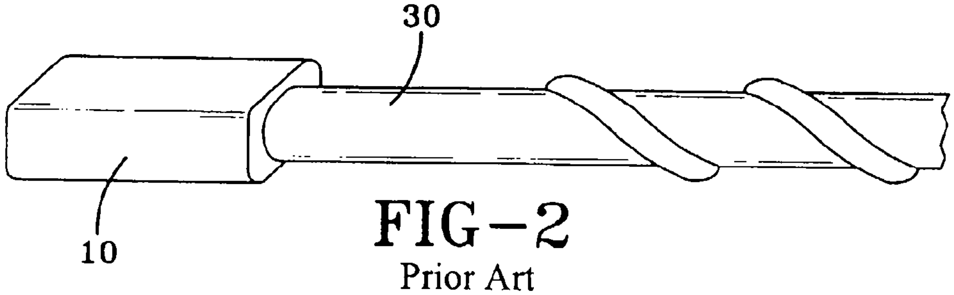
FIG-2 Prior Art
FIG. 2 is a view similar to FIG. 1, but showing a protective sleeve disposed about the electrical cable.

For airport applications such as described immediately above, electrical cable 20 is fully encased in a protective sleeve 30 which is installed by sliding over cable 20 until the sleeve abuts plug 10, as shown in FIG. 2. A preferred protective sleeve 30 for use with the connector of the present invention is relatively lightweight and flexible due to its formation from a combination of materials, and is sold under the trademark LCD™ by Salem-Republic Rubber Company of Sebring, Ohio. Protective sleeve 30, when properly secured on electrical cable assembly 5, slides easily and with little abrasion across hard surfaces, including the concrete surface at an airport, and protects electrical cable 20 from excessive wear and tear associated with being dragged across such hard surfaces during use. Protective sleeve 30 is removable from electrical cable 20 in case replacement or repair of electrical cable assembly 5 or the sleeve is required.

Figure 3:
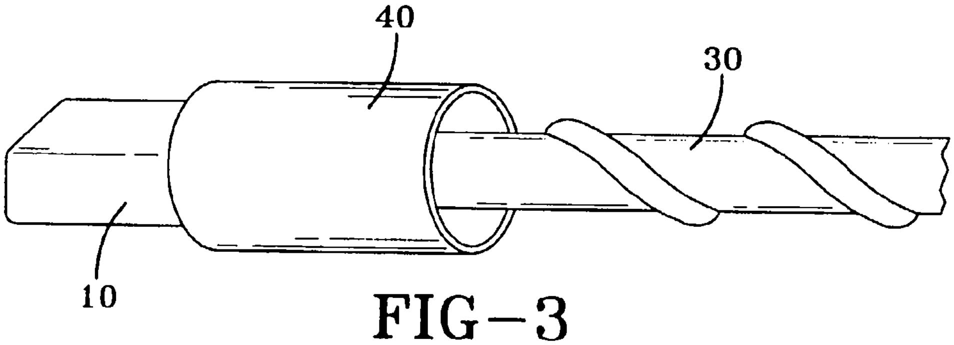
FIG. 3 is a view similar to FIG. 2, but showing a shrinkable tube of the present invention disposed about a portion of the plug and adjacent protective sleeve prior to shrinking of the tube.
Figure 4:
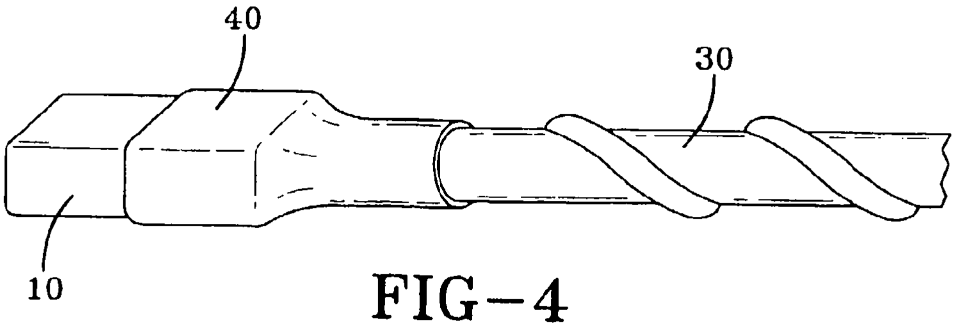
FIG. 4 is a view similar to FIG. 3, but showing the shrinkable tube subsequent to application of heat to the tube causing it to shrink into secure mechanical engagement with the plug and sleeve.

In accordance with the present invention, a connector for mechanically, securely and immovably mounting protective sleeve 30 about electrical cable 20 is indicated at 40, and is shown in FIGS. 3 and 4. Connector 40 preferably is formed of a heat-shrinkable tubing of the type commonly used for the protection of electrical terminals or connectors where the shrinkable tubing also serves as an insulator. A preferred shrinkable tubing for forming connector 40 of the present invention is marketed by Raychem Corporation, Electrical Power Products, of Menlo Park, Calif. Although it is contemplated that other appropriate shrinkable tubing can be used to form connector 40 of the present invention, the interior surface of Raychem™ shrinkable tubing is precoated with an adhesive that, when heated, melts and flows to form a bond that seals out moisture and corrosion and follows the thermal expansion of electrical cable 20.

In accordance with an important feature of the present invention, connector 40 is slipped over the cuff of protective sleeve 30 and a portion of adjacent plug 10 as shown in FIG. 3, and heated. A hot air blow torch preferably is used to apply sufficient heat to connector 40, although it is contemplated that other appropriate heat sources could be used, such as a clean burning propane torch or a belt heater. The amount of heat applied to connector 40, and the duration for which it is applied, will depend upon the exact type and thickness of shrinkable tubing employed. However, the heat should be applied directly to connector 40 at a temperature, and for a duration, that will cause connector 40 to shrink, but not cause damage to protective sleeve 30, plug 10 or cable 20. The applied heat causes connector 40 to shrink around the cuff of protective sleeve 30 and a portion of plug 10, thereby forming a relatively thin, smooth, and secure mechanical connection between the plug and the protective sleeve.

In accordance with one of the main features of the present invention, relatively smooth connector 40 enables a worker, who must place his/her hands at the point of juncture between plug 10 and protective sleeve 30 every time the cable is electrically connected to the plane, to efficiently and safely handle cable assembly 5 without injuring his/her hands on bulky band clamps and the like. Moreover, relatively thin connector 40 does not significantly increase the diameter of plug 10, which is important since the available space for connecting the plug to the plane receptacle is limited.

Another feature and advantage of inventive connector 40 is that the mechanical attachment between plug 10 and protective sleeve 30 retains the protective sleeve its place with respect to electrical cable 20 and the plug, and prevents the protective sleeve from bunching up on or sliding off of and exposing the electrical cable. If protective sleeve 30 were permitted to dislocate, excessive wear of electrical cable 20 could result, and if the protective sleeve bunched up it could fail. It is understood that connector 40 can be relatively easily removed from cable assembly 5 to enable replacement/repair of cable 20, plug 10, sleeve 30, or the connector itself.

It is contemplated that connector 40 of the present invention could also be used for making mechanical connections on other types of cables, wires, cords, sleeves, and the like, including electrical cables having more than a pair of ends.

Accordingly, the connector of the present invention for securing a protective sleeve to an electrical cable is simplified, provides an effective, safe, inexpensive and reliable device which achieves all of the enumerated objectives, provides for eliminating difficulties encountered with prior connectors, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the connector is used to secure a protective sleeve on an electrical cable, the characteristics of the construction, arrangement and method steps, and the advantageous, new and useful results obtained; the new and useful structures, devices, elements, arrangements, process, parts and combinations are set forth in the appended claims.

What is claimed is:

1. An electrical cable assembly including an electrical cable having at least a pair of ends and being electrically connected to a power source at one of said pair of ends and being electrically connected to a plug at the other of said pair of ends, said electrical cable being encased in a protective sleeve, wherein the improvement comprises:

a) a heat-shrinkable member disposed about a portion of said protective sleeve adjacent to said plug and at least a portion of the plug, so that upon application of heat to said member the member shrinks into contact with said sleeve and said plug to immovably secure the sleeve in place about said electrical cable.

2. The improved assembly of claim 1, in which said electrical cable assembly supplies electrical power to an airplane on the ground.

3. The improved assembly of claim 1, in which said member is a tube and is relatively thin and smooth after heating; and in which said tube is capable of being removed subsequent to heating.

4. A method of immovably securing a protective sleeve having a pair of ends, on an electrical cable of an electrical cable assembly, said cable assembly including said cable having at least a pair of ends and being electrically connected to a power source at one of said pair of ends and being electrically connected to a plug at the other of said pair of ends, said electrical cable being encased by said protective sleeve, said method including the steps of:

a) sliding said sleeve about said cable and abutting a selected one of said sleeve ends against said plug;

b) sliding a heat-shrinkable member about said abutting sleeve end and at least a portion of said adjacent plug; and c) applying sufficient heat to said member to shrink said member into contact with said sleeve and said plug to immovably secure the sleeve on said electrical cable.

5. The method of claim 4, in which said electrical cable assembly supplies electrical power to an airplane on the ground.

6. The method of claim 4, in which said member is a tube and is relatively thin and smooth after heating; and in which said tube is capable of being removed subsequent to heating.

7. The method of claim 4, in which said heat is applied by a hot air blow torch.

* * * * *